United States Patent Office 3,054,665
Patented Sept. 18, 1962

3,054,665
PELLETIZING OF CARBON BLACK
John S. Kosewicz, Monroe, La., assignor to Commercial Solvents Corporation, New York, N.Y., a corporation of Maryland
No Drawing. Filed Apr. 22, 1960, Ser. No. 23,911
5 Claims. (Cl. 23—314)

My invention relates to a method of pelletizing carbon black and, more particularly, to a process for pelletizing carbon blacks, that are extremely difficult to pelletize.

When carbon black is first formed, it is extremely light and fluffy because of the fine division of its constituent particles. Because of its light bulk and fluffy character, it is very hard to handle as it tends to sift through the containers used to confine it, thus dusting so as to contaminate other materials to which it may have access. This is an annoyance to both manufacturers and to workmen.

Many ways have been devised to avoid the difficulties incident to the use of carbon blacks by various methods of agglomerating them to a granular condition that reduces their bulk and, particularly, their dustiness. This granular, pelletized, or nodulized form of carbon black is very advantageous in that the carbon black can be much more easily packed, transported, stored and used with a minimum of dusting.

Unfortunately, there are certain carbon blacks that are very hard to pelletize. These hard to pelletize carbon blacks have very low oil contents which make some of them very desirable because of their non-staining qualities. These low-oil content carbon blacks, of less than 0.25% oil by weight, cannot be readily pelletized by conventional means and it is the object of this invention to provide a process to efficiently and economically pelletize them.

The presence of oils in most carbon blacks is beneficial to their pelletizing qualities, as the oil acts as a cohesive substance to bind the carbon particles into conglomerate units. When this oil is not present, or is present to a much lesser degree, great difficulty is encountered in attempts to pelletize such carbon blacks.

I have now discovered a new process for pelletizing carbon black of low oil content. My new process is convenient and economical and does not require utilization of unusual or expensive equipment.

My new process involves the steps of first precompressing the carbon black by passing it through rollers under controlled conditions to form small flakes and then pelletizing the small flakes, by loading them into a pelletizing drum and rotating the drum under controlled conditions.

I prefer to practice my invention by taking the carbon black just as it comes from its process of manufacture and passing it through a pair of equal peripheral speed rollers. The reason I use equal peripheral speed rollers is that I want the fluffy carbon black to be compressed into flakes. If the rollers were not rotating at an equal peripheral speed they would tend to impart a grinding motion on the carbon black which would not aid in the formation of flakes. After passing through the rollers, the carbon black is in the form of small flakes. I have found it preferable to use steel rollers to compress the carbon black into the small flakes, but rollers made of other materials of the same general hardness will work just as well. Rubber covered rollers or other materials of that degree of softness also worked, but not as well because the softness of the rollers imparted a grinding motion to the carbon black. I have also found it very satisfactory to place the rollers very close to each other at distances from about 0.03 inch to about 0.07 inch apart. It will be readily understood that this spacing will vary somewhat with the characteristics of the various carbon blacks being compressed. One of the very important factors that varies the characteristics of the carbon black is its oil content, and in general the lesser the oil content, the harder it will be to agglomerate.

The small flakes produced by the precompression step of my process are then loaded into pelletizing drum. A pelletizing drum satisfactory for my process can be an ordinary drum with an opening at one end, or at least one opening any place in it that can be closed, which is capable of being rotated on its longitudinal axis. The inside of the drum should be smooth and should not have any blades, paddles, or steps, etc., in it. When the drum is rotated on its longitudinal axis, the carbon black flakes closest to the wall of the drum are lifted upwardly by the motion of the drum wall to a point where the action of gravity takes over and the flakes flow downwardly over the carbon black flakes, which at that time are closer to the wall of the drum and are being lifted up. Various increments or layers of carbon black flakes between the carbon black closest to the drum wall, and going up, and the carbon black under the effect of gravity, and coming down, are affected by these two countercurrent motions and themselves move and pass over each other. The whole mass shifts and flows over itself very much as a viscous fluid would. This gentle flowing motion imparted to the flakes converts them into pellets of generally spherical shape.

The conditions of my process will vary with the various types of carbon blacks used. For example, the speed of rotation of the drum, the size of the charge, the size of the drum, the length of time required to pelletize the flakes, etc., can be varied. The speed of rotation of the drum will vary with the size of the drum being used and the size of the charge of carbon black flakes within it. However, it can generally be said that the smaller the diameter of the drum the more revolutions per unit of time will be required. Nine to sixteen r.p.m. with 6 to 10 foot drum diameters are not unusual. The size of the charge will, of course, vary with the size of the drum being used. For example, in a drum of a diameter of 6 feet and a length of 3 feet, a charge of about 600 pounds of carbon black flakes is very satisfactory. The process also works very well when a 1,000 pound charge is used in a drum that has a diameter of 10 feet and is 5 feet long. In general, the drum can be filled to about ¼ to about ⅓ of its volume with carbon black. The length of time the drum will have to be rotated, in order to form the pellets, will vary with the pellet hardness desired and the condition of the carbon black being used. Under normal conditions, approximately 2 to 5 hours are required for pelletization.

The conditions in the pelletizing drum can be adjusted to fit the size of the drum. In the operation of my process, it is important to keep the mass within the drum in an apparent fluid state without cascading the carbon black within. It should be borne in mind that specific velocities of rotation, drum dimensions, weights of charge, etc., can be varied without going outside the scope of my invention. Essentially, the carbon black must be first precompressed to form small flakes and these flakes must then be subjected to the motion of the rotating drum so that the flakes flow over each other in a fluid motion to form pellets.

Obvious variations of my invention can be employed without departing from the scope of my invention. For example, a long rotating inclined drum with openings at each end may be used in such a manner that the flakes would be inserted at the higher end and pellets removed at the lower end, thereby providing a continuous process for pelletizing carbon black.

The following example is offered to illustrate my new process. However, I do not intend to be limited to the specific materials, proportions or procedures employed. Various equivalents of my process will obviously occur to those skilled in the art and I intend to include such equivalents within the scope of my invention.

*Example I*

Carbon black powder having an oil content of about .06% by weight was passed through a pair of steel rollers 0.05 inch apart. The steel rollers had a diameter of 7.950 inches, had 27.5 inches of usable length and were rotated at 10 r.p.m. After passing through the rollers, the carbon black was in the form of small flakes. A 600 lb. charge of these flakes was inserted into a pelletizing drum that had a 6 foot diameter and was 3 feet long. The inside of the drum was smooth and did not have any blades, paddles or steps, etc. The drum was then rotated at 13 r.p.m. for 3.5 hours. The resulting carbon black pellets were relatively hard and were not dusty.

Now having described my invention, what I claim is:

1. A process of pelletizing carbon black having an oil content of less than about 0.25% by weight which comprises precompressing said carbon black into small flakes and flowing said flakes over each other in a rotating drum by continually carrying said flakes upwardly and allowing said flakes to flow back slowly by gravity over additional masses of said flakes that are being carried upwardly in said drum until relatively hard pellets are formed from said flakes.

2. A process of pelletizing carbon black having an oil content of less than about 0.25% by weight which comprises precompressing said carbon black into small flakes and flowing said flakes over each other in a rotating drum rotating at such speed that said flakes are continually carried upwardly to a point from which they flow back slowly by gravity over additional masses of said flakes that are being carried upwardly in said drum until relatively hard pellets are formed from said flakes.

3. A process of pelletizing carbon black having an oil content of less than 0.25% by weight which comprises precompressing said carbon black into small flakes by passing said carbon black through closely spaced, counter rotating rollers, and flowing said flakes over each other in a rotating drum by continually carrying said flakes upwardly to a point from which said flakes flow back slowly by gravity over additional masses of said flakes that are being carried upwardly in said drum until relatively hard pellets are formed from said flakes.

4. A process of pelletizing carbon black having an oil content of less than 0.25% by weight which comprises precompressing said carbon black into small flakes by passing said carbon black through closely spaced, counter rotating rollers, and flowing said flakes over each other in a rotating drum rotating at such speed that said flakes are continually carried upwardly to a point from which said flakes flow back slowly by gravity over additional masses of said flakes that are being carried upwardly in said drum until relatively hard pellets are formed from said flakes.

5. A process of pelletizing carbon black having an oil content of less than 0.25% by weight which comprises precompressing said carbon black into small flakes by passing said carbon black through closely spaced, counter rotating, equal peripheral speed rollers, and flowing said flakes over each other in a drum rotating at from about 9 to about 16 r.p.m., said flakes being continually carried upwardly to a point from which they flow back slowly by gravity over additional masses of said flakes that are being carried upwardly in said drum until relatively hard pellets are formed from said flakes.

References Cited in the file of this patent

UNITED STATES PATENTS 2,502,106    Skoog et al. _____ Mar. 28, 1950

FOREIGN PATENTS 475,847    Great Britain _____ Nov. 26, 1937